April 29, 1941.   S. M. LILLIS   2,240,263
COMPOSITE SEALING STRUCTURE
Filed March 1, 1938

STEPHEN M. LILLIS
INVENTOR
PER
ATTORNEY

Patented Apr. 29, 1941

2,240,263

UNITED STATES PATENT OFFICE 2,240,263

COMPOSITE SEALING STRUCTURE

Stephen M. Lillis, Chicago, Ill., assignor to Victor Manufacturing & Gasket Company, Chicago, Ill., a corporation of Illinois Application March 1, 1938, Serial No. 193,335

3 Claims. (Cl. 288—26)

The present invention relates to composition structures at present finding their principal use in the gasket industry.

An important object of this invention is the provision of a composition structure that provides a seal between metallic or similar surfaces while, at the same time, not adhering to said surfaces.

Another important object of this invention is the provision of a composition sealing structure which permits the gasketed parts to be separated after assembly and again reassembled, should difficulties be discovered that necessitate disassembly. For instance, in automobile engines, the mechanic frequently assembles the cylinder head on the block and operates the motor for a few minutes only to find that faulty valve action or other difficulties require the removal of the cylinder head. It is desirable that the gasket or sealing element used between the head and block be reusable without reworking.

A further object of this invention is the provision of a composition structure resistant to the solvent action of water, various anti-freezes or similar fluids to which gaskets are subjected.

An important object of this invention is the provision of a coating composition that does not melt and flow out at higher temperatures while still being sufficiently soft to seal at ordinary temperatures.

Still another object of this invention is the production of a non-adhesive outer surface for gaskets in general and a sealing layer between laminations of laminated metallic gaskets and the like.

Other and further important objects of the invention will be apparent from the following specification and accompanying drawing.

The invention, in a preferred form, is shown in the drawing and hereinafter more fully described.

Figure 1:
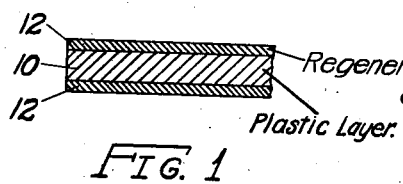
Figure 1 is a sectional view of the improved composition sealing structure of my invention.

If machined metal surfaces corresponded to each other perfectly, no gasket would be required for the joint between the parts to be gas or liquid tight. Such perfection of surfaces is not obtainable in practical production and gaskets are used in such joints to provide a seal. The gasket provides a seal by accommodating itself accurately to the irregularities of the machined surfaces, i. e., the gasket is capable of changing its thickness dimensions without detrimentally altering its surface or area contour. In automobile cylinder head gaskets, for example, this accommodation to variations in thickness is provided by the use of a compressible asbestos sheet usually incased between relatively thin, ductile and flexible sheets of copper. The ridges of the machined cylinder head and block, under pressure, compress the copper and asbestos layers, while the uncompressed portions fill in and seal the valleys between the ridges. A gasket of this type seals by a change in volume and the surface contour or shape of the gasket is not greatly distorted. The asbestos in the gasket provides a sealing between the larger irregularities of the parts being gasketed, but it cannot bend the metal layers into relatively fine scratches and leaks frequently result.

In the past, various compositions have been tried in an effort to produce a gasket that will seal tightly. These compositions fall into three principal classes, (a) viscous compositions, (b) plastic compositions, and (c) setting compositions. These must be applied shortly prior to actual use of the gasket since the gasket cannot be successfully handled or stored after the coatings are applied.

For example, automotive cylinder head gaskets have been daubed with grease or heavy bodied oils like blown castor oil, blown hempseed oil and the like. These coatings have little mechanical strength and must be applied immediately prior to the use of the gasket in order not to be rubbed off or destroyed in shipment, storage or handling. A further disadvantage is that these gaskets must be recoated after use before they can be reused.

Automotive cylinder head gaskets have been coated also with plastic materials such as shellac or asphalt, either from solution or in a melted form. These coatings also must be applied to the gaskets immediately prior to usage else the gaskets will stick together, especially in warm places. If the coating is sufficiently firm not to flow and stick at ordinary temperatures, the gasket does not seal when installed cold, and the engine must be warmed up before a satisfactory seal is attained. If the coating is sufficiently soft to seal at ordinary temperatures, it melts at high temperatures and permits the gasket to leak under those conditions and at high pressures. A further and serious difficulty with these coatings is that they stick to the parts being gasketed. It is extremely difficult to separate the gasketed parts and the gasket is usually destroyed in the disassembly. Should the gasket not be completely destroyed it must, in any event, be recoated before re-use.

Sometimes cylinder head gaskets have been dipped in clear cellulose nitrate lacquers or the like immediately before use. When water comes in contact with the dissolved lacquer, the cellulose nitrate coagulates and thus the seal is obtained, or the motor is allowed to stand for a sufficient time for the lacquer to dry.

All of these coatings have the objection that they must be applied at an inconvenient time immediately before use, and the gaskets must be recoated before they can be re-used.

In an effort to eliminate the objection to applying these coatings immediately prior to use, many coatings have been applied to gaskets before shipment or use, but the difficulty has always been that such coatings had to be hard in order that the gaskets could be shipped, stored and handled and these hard coatings would not seal hot, much less cold. Even then, the coatings stuck and were destroyed when the gasketed parts were disassembled. A soft coating could not be used because stored gaskets stuck together and because the soft coating would not withstand shipment, storage and handling.

Prior art has many instances where a second film has been applied over an existing coating and where this second film is different in composition from the underneath coating. But the prior art does not show any coating or composite structure that is tough, not surfacely adhesive, deformable or displaceable in a direction at right angles to the surface, and yet stable in the plane of the surface.

Having once discovered the physical and physico-chemical limitations whereby I may carry out my invention, I find that a large number of materials may be used so long as these materials have been chosen with careful regard to these very definite physical and physico-chemical limitations. My invention is not bounded by the exact compositions I shall describe in order to specifically illustrate the workings of my invention, but by the combination of physical and physico-chemical characteristics illustrated by these specific examples and those skilled in the art will appreciate that numerous other compositions may be used so long as they meet the physical and physico-chemical requirements of my invention that I hereinafter disclose. My outer surface must be non-adhesive in shipment, storage or use and I must have an intervening layer that prevents any ingredients contained in the underlying composition from operating on the non-adhesive outer surface and creating surface adhesiveness thereby.

As used in this specification, I wish the term "impermeability" and allied terms based on the root word "permeable" to mean that material so described is an effective damper in that it does not permit adhesive creating ingredients contained in my composite structure to migrate as such through the material. By imperviousness, as distinguished from impermeability, I mean that the material may permit migration or be penetrated by adhesively active ingredients contained in my composite structure but that the adhesively active ingredients after migrating into or penetrating such material are no longer able to impart adhesiveness to the outer surface in that the adhesively active ingredients are in an inside phase, have been neutralized, or the like.

Figure 2:
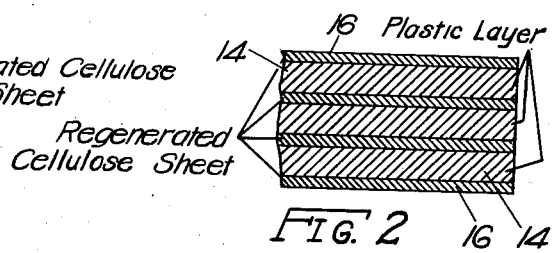
Figure 2 is a similar sectional view, showing a modification.

As shown in the drawing:

My composite sealing structure may be used per se, it may form a part of other structures or other structures may form a part of my composite structure. Figures 1 and 2 show embodiments of my invention wherein my composite structure may be used per se. Figures 3, 4, 5 and 7 show embodiments of my invention in which another structure or element forms part of my composite structure. Figure 6 shows an embodiment of my invention in which my composite structure forms part of another structure such as, for instance, an automobile cylinder head. A metal layer or gasket may form one of the outer surfaces or intermediate layer of my composite structure and/or may form an inner portion of my composite structure.

In order to more fully describe the principles of my invention and the manner of its use, I cite the following examples:

EXAMPLE I

As an example of the embodiment of my invention into a composite structure usable as a gasket per se, I start with a suitable sheet material such as regenerated cellulose, cellulose ethers and esters or the like. Suitable base films are on the market under the trade names of Cellophane, Kodopak, Sylphwrap, and the like. I then coat this sheet with a suitable composition in a knife coater similar in design to those generally known and universally used in the fabric coating art. As an example of a suitable plastic coating that I may use in carrying out my invention, I cite the following formula:

*Formula 1*

| | Kilograms |
|---|---|
| Pale crepe rubber | 100 |
| Zinc oxide | 100 |
| Wood rosin | 100 |
| Agerite powder | 2 |
| Benzol | 500 |

I place the rubber on a warm rubber mill and mill it to a smooth sheet, whereupon I incorporate the zinc oxide and anti-oxidant. When the anti-oxidant and zinc oxide have been dispersed in the rubber, I strip the mass from the mill and allow it to stand for 24 hours. I place this compound in a rubber cement dissolver, add the wood rosin and benzol and mix until dissolved. The resultant paste is of a knife coating consistency, and, when dried, is suitably plastic for the purpose of my invention. I then combine two or more layers of cellulose material coated according to the foregoing description, with their adhesive sides toward each other. This composite structure sheet may be blanked into the particular gasket design needed, and there results a complete gasket ready for use by the operator without further processing or treatment.

As an alternative method, I may obtain the same final product as shown in Fig. 1 and described, by coating the starting sheet with double the amount of plastic ingredient and assembling this coated film with an uncoated film.

For most purposes, where a thin gasket is called for, I prefer to use but one layer of adhesive plastic 10, and two layers of non-adhesive cellulosic film base 12, as previously described and as illustrated in Figure 1. For thicker gaskets, I prefer to combine several layers of adhesive 14 with several layers of film 16, to produce a laminated structure as illustrated in Figure 2.

Example II

As a further example of the embodiment of my invention into a composite structure usable as a gasket per se, I start with a suitable sheet material such as regenerated cellulose. I then coat this regenerated cellulose sheet in a manner like that described in Example I with a formula as follows:

*Formula 2*

| | Kilograms |
|---|---|
| RS ½ second cellulose nitrate | 10 |
| Synthetic resin "A" | 20 |
| Butyl acetate | 20 |
| Toluene | 35 |

The synthetic resin "A" is made as follows:

| | Kilograms |
|---|---|
| Paratoluene sulfonamide | 171 |
| Formaldehyde (40%) | 150 |

These ingredients are refluxed for 4.5 hours at 110–120° C. The batch is allowed to cool and is then shaken with 50 kilograms commercially pure benzene and the resultant two phases allowed to separate. The lower liquor is drained off and heated in the open for two hours at a temperature gradually rising from 100 to 150° C. The coated sheet is dried and then may be combined and used in a like manner to the product described in Example I.

Example III

Figure 3:
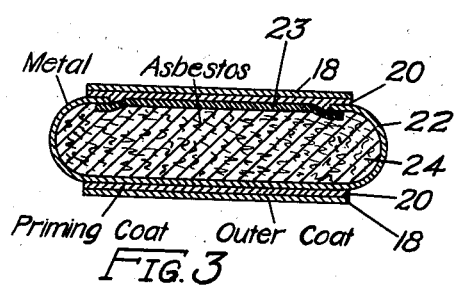
Figure 3 is a detailed sectional view, showing the composition sealing structure of my invention applied to a type of asbestos and metal gasket.

As an example of the embodiment of my invention wherein a previously manufactured gasket forms an interior layer of my composite sealing structure, I cite the following: Figure 3 is a cross section of this composite sealing structure in which 18 is an outer tough non-adhesive undisrupted coating, 20 is a plastic adhesive priming coat, 22 is a sheet metal layer shaped as shown, 23 is a sheet metal top layer and 24 is a compressible asbestos board. In my preferred procedure for making this embodiment of my invention, I printcoat the top side of a metal incased asbestos gasket with a plastic formula 20 of which Formula 1 is an example. I dry this coated gasket in a tunnel drier and printcoat thereon a second coating 18 of the following composition:

*Formula 3*

| | Kilograms |
|---|---|
| Cellulose acetate, 40 second A–9 type | 12.5 |
| Acetone | 25.0 |
| Ethylene dichloride | 37.5 |

When this second lacquer coating 18 is dried, there results a tough, non-adhesive, undisrupted film that is impervious to adhesion creating ingredients from the underneath coating. I then turn the gasket over and coat the opposite side in the same manner as previously described. I may coat both sides of the gasket with plastic before applying the non-adhesive film but I find that gaskets so coated have a tendency to stick together, for which reason I prefer the foregoing described procedure of completely coating one side before coating the other side.

Example IV

I may produce my composite sealing structure illustrated in Figure 3 by first coating the gasket with a lacquer of the following formula instead of with Formula 1 cement as was done in Example III.

*Formula 4*

| | Kilograms |
|---|---|
| RS ½ second cellulose nitrate | 13.4 |
| Synthetic resin "B" | 30.6 |
| Tricresyl phosphate | 25.0 |
| Ethyl acetate | 116.0 |
| Toluol | 120.0 |

The synthetic resin "B" is made as follows:

| | Kilograms |
|---|---|
| Phthalic anhydride | 50 |
| Diethylene glycol | 50 |
| Castor oil | 20 |
| Maleic anhydride | 10 |

These ingredients are charged into a Monel metal varnish kettle and the batch rapidly heated to 290° C. and held for 15 minutes or until an acid number of between 45 and 50 is obtained. I then coat Formula 3 on top of this plastic coating in the same manner as described under Example III.

Example V

Figure 4:
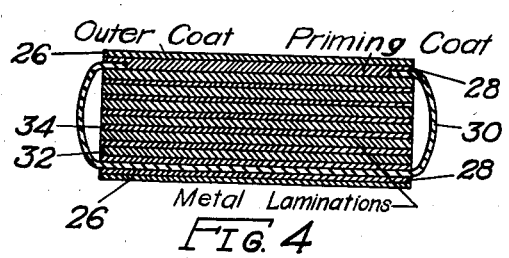
Figure 4 illustrates the composition sealing structure of my invention as applied to a laminated all-metal gasket.

Figure 4 illustrates a still different embodiment of my invention. Here 26 is a tough, non-adhesive unbroken outer film, 28 is a plastic adhesive layer, and 30 is a metal channel enclosing a plurality of metallic laminations 32, each preliminarily coated with one of the improved plastic coverings of this invention, as at 34. In manufacturing this embodiment of my invention, I prefer to coat the under surface only of each of the metal filling layers 32 with a plastic adhesive 34 similar in composition to that of Formula 4. I do not coat the interior of the metal channel 30. I then assemble the interior coated layers in the manner shown in the figure and close the channel to form a gasket structure. This gasket structure I then coat in accordance with the procedure outlined under Example IV.

Example VI

Figure 5:
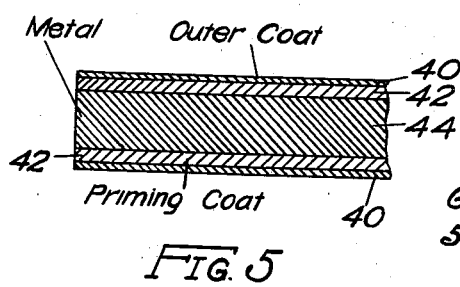
Figure 5 is a sectional view, showing the improved composition sealing structure of my invention applied to a solid all-metal gasket element.
Figure 6:
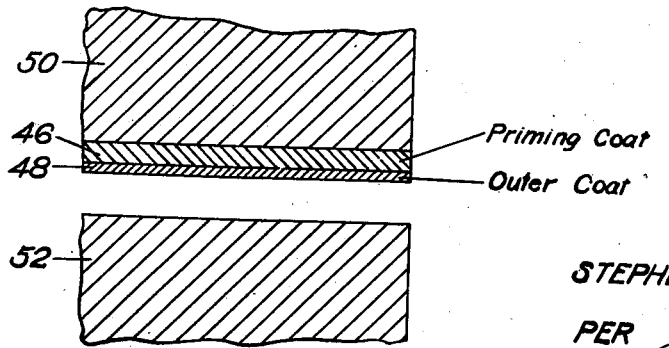
Figure 6 is a further sectional view, illustrating still another embodiment of my invention wherein the improved composition sealing material is applied directly to the two metallic elements to be joined and sealed, as, for example, the cylinder head and block of an internal combustion engine.

Still another embodiment of my invention is illustrated in Figure 5 wherein 40 is a tough undisrupted outer film, 42 is a plastic adhesive layer and 44 is a relatively thick metal layer.

Example VII

Another embodiment of my invention is illustrated in Figure 6 wherein my composite structure 46 and 48 has been applied directly to the parts being gasketed and forms a part thereof. These may be the cylinder head 50 and block 52 of an internal combustion engine.

Example VIII

Figure 7:
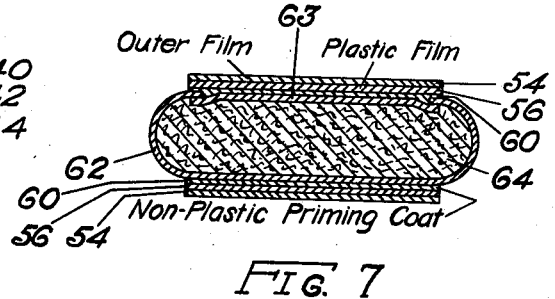
Figure 7 is a sectional view somewhat similar to Figure 3, but showing a further modification of the invention wherein a metal asbestos gasket has its surfaces coated with a plurality of films composed of several of the improved sealing compositions of my invention.

An additional embodiment of my invention is illustrated in Figure 7 wherein 54 is the tough non-adhesive undisrupted outer film, 56 is a plastic non-adhesive center film, 60 is an adhesive, non-plastic priming coat, 62 is a metal channel, 63 is a metallic layer and 64 is an asbestos layer. Following is an example of a formula suitable for the production of the plastic, non-adhesive center film 56.

*Formula 5*

| | Kilograms |
|---|---|
| Benzyl cellulose | 25 |
| Dibutyl phthalate | 25 |
| Butanol | 25 |
| Ethyl acetate | 25 |
| Toluol | 200 |

Following is an example of a formula suitable for the production of the adhesive non-plastic priming coat 60.

*Formula 6*

| | Kilograms |
|---|---|
| RS ½ second cellulose nitrate | 10 |
| Gum mastic | 10 |
| Zinc oxide | 10 |
| Whiting | 20 |
| Tricresyl phosphate | 3 |
| Blown castor oil | 3 |
| Butyl acetate | 75 |
| Toluol | 50 |

The tough non-adhesive undisrupted outer film 54 may be produced from a formula similar to Formula 3.

In this example I have shown a combination of layers wherein the outer layer 54 is impervious to adhesive creating agents or is not adhesively affected thereby. But for the purpose of my invention I may use an intermediate layer 56 which is impervious to or prevents the transfer of adhesive creating agents from a lower film 60 to the outer film 54. In this instance, the two components 54 and 56, form my outer non-adhesive layer which is impervious to or adhesively not affected by adhesion creating agents in the underneath composition.

In the foregoing examples I have used non-adhesive formulas for the outer film. I prefer to apply the outer film using a solvent blend that is not a solvent for the preceding layers but I am not limited to the use of a non-solvent blend for I have produced successful embodiments of my invention wherein the solvent blend, used in the outer coating formula, can dissolve a preceding layer. The use of a solvent blend for the outer coating that will not dissolve preceding layers, does not assure the successful carrying out of my invention for the success of my invention revolves around the particular physical and physico-chemical properties of the component parts of the structure as they exist in use. In the preceding examples I have illustrated embodiments of my invention wherein the outer layer or layers contain no adhesive ingredients and, while in use, are impervious to adhesive imparting ingredients contained in the composite structure.

I have found that certain variations in the method of applying, drying or otherwise handling the production of my composite structure prior to use sometimes has detrimental effects on the success of the finished product, as for instance, solvent retention or blushing may provide a structure whose physical and physico-chemical properties do not meet the requirements of my invention and the composite structure is not non-adhesive in use even though the solids in the formula are capable of successful use if properly applied.

In the foregoing examples of the practice of my invention I have obtained my non-adhesive outer surface by a separate composition layer but I may obtain this non-adhesive outer surface by transforming the outer portion of an already existing layer into a film whose surface is non-adhesive and whose body is impenetrable to adhesive creating ingredients contained in the composite structure. I may do this by various expedients such as hydrolysis, oxidation or the like, depending upon the specific composition and properties of the materials used.

I may carry out my invention also by using a penetrable outer coating and incorporating therein ingredients that react with or neutralize any migrating adhesion creating ingredients. In this way, migrating adhesion creating ingredients are converted into non-adhesive creating ingredients and for the purpose of my invention, my outer film thereby remains impervious to adhesive creating ingredients. In other words, I may obtain imperviousness by neutralization as well as by impenetrability.

In practicing my invention, it must be kept in mind that not only must the ingredients of the individual layers forming my composite structure be chosen with care, but that the mechanical and physical conditions of application must be carried out with care also in order that the outer surface will be non-adherent and will remain so in use.

Adhesive creating ingredients need not necessarily be adhesive in themselves, and the reverse is true, in that ingredients adhesive in themselves are not necessarily adhesive in combination. It is also possible that the outer surface of my composite structure may be adhesive when first installed, but that this adhesiveness is destroyed by heat or other conditions of use, and for the purpose of this invention, this serves as a non-adhesive outer surface.

It will, therefore, be evident that I have developed a new composition sealing structure that withstands the rigors of shipment, storage and handling, yet provides a tight seal at ordinary temperatures and does not flow out at elevated temperatures. My gaskets do not stick together nor to the parts being gasketed and the gasket is frequently re-usable many times without further preparation. My composition structure, at the present time, finds its greatest application as a gasket coating but it has other applications, including gasket functions per se, as will be evident, to those skilled in the art, from the foregoing examples.

From the foregoing specifications and examples, those skilled in the art to which it appertains, will appreciate the many different ways in which my composition sealing structure may be made and used. I may, for instance, apply it to more than one of the surfaces. I may use a non-plastic foundation with a plastic non-adhesive outer film. I am not limited to the use of but two different compositions. Many widely different embodiments of this invention may be made without departing from the spirit and scope thereof, and it is to be understood that this invention is not limited to the specific embodiments thereof except as defined in the appended claims.

I claim as my invention:

1. A gasket structure comprising a layer of asbestos, a sheet metal covering for the asbestos, and a sealing covering for the metal including an inner layer of a plastic material containing cellulose nitrate and a plasticizing resin, and a non-adhesive outer layer substantially of cellulose acetate.

2. In a gasket structure having metallic surfaces, a plastic covering on the exposed surfaces of the metal including an inner layer of a plastic material adhering to the metal and forming a cushion and containing cellulose nitrate and a plasticizing resin, and a non-adhesive outer coating substantially of cellulose acetate.

3. In a metal-clad, asbestos gasket, a sealing covering for the exposed metallic surfaces of the gasket comprising a relatively thick layer of a plastic material adhered to the exposed metallic surfaces and containing cellulose nitrate and a plasticizer, and a relatively thin non-adhesive outer layer substantially of cellulose acetate to prevent its adherence to surfaces brought in contact therewith.

STEPHEN M. LILLIS.